United States Patent
Manor et al.

(10) Patent No.: US 7,668,898 B2
(45) Date of Patent: *Feb. 23, 2010

(54) CALCULATING CIRCUIT AND METHOD FOR COMPUTING AN N-TH ROOT AND A RECIPROCAL OF A NUMBER

(75) Inventors: Yonatan Manor, Haifa (IL); Noam Galperin, Maalot (IL)

(73) Assignee: Zoran Corporation, Sunnyvale, CA (US)

(*) Notice: Subject to any disclaimer, the term of this patent is extended or adjusted under 35 U.S.C. 154(b) by 856 days.

This patent is subject to a terminal disclaimer.

(21) Appl. No.: 11/316,891

(22) Filed: Dec. 27, 2005

(65) Prior Publication Data

US 2006/0136538 A1    Jun. 22, 2006

Related U.S. Application Data

(63) Continuation of application No. 10/177,746, filed on Jun. 24, 2002, now Pat. No. 6,999,986.

(51) Int. Cl.
*G06F 7/38*  (2006.01)
*G06J 1/00*  (2006.01)
*G06G 7/20*  (2006.01)

(52) U.S. Cl. .................... 708/605; 708/3; 708/807
(58) Field of Classification Search ................ 708/605, 708/500, 502, 3, 807
See application file for complete search history.

(56) References Cited

U.S. PATENT DOCUMENTS

| 3,648,038 | A | 3/1972 | Sierra |
|---|---|---|---|
| 4,694,417 | A | 9/1987 | Cantwell |
| 4,757,467 | A | 7/1988 | Dieterich et al. |
| 5,206,823 | A | 4/1993 | Hesson |
| 5,220,524 | A | 6/1993 | Hesson |
| 5,235,535 | A | 8/1993 | Nakayama |
| 5,274,580 | A | 12/1993 | Keryvel et al. |
| 5,798,955 | A | 8/1998 | Matsubara |
| 6,108,682 | A | 8/2000 | Matheny |
| 6,260,054 | B1 | 7/2001 | Rosman et al. |
| 6,769,006 | B2 | 7/2004 | Krouglov et al. |
| 2003/0028574 | A1 | 2/2003 | Takagi |

*Primary Examiner*—Tan V Mai
(74) *Attorney, Agent, or Firm*—Morgan, Lewis & Bockius LLP (57) ABSTRACT

A calculating circuit and a method for generating an output signal representing an output number approximating an N-th root and/or a reciprocal of an input number represented by an input signal are described. The calculating circuit includes a subtractor circuit, an integrator circuit, and a multiplier circuit. The subtractor circuit responsive to a first signal and a feedback signal and configured for generating an error signal representing a difference between the first signal and the feedback signal. The integrator circuit responsive to the error signal and configured for computing the output signal. The multiplier circuit responsive to the output signal and configured for generating a feedback signal. The method for generating the output signal includes the following iterative steps: (i) generating an error signal at a j-th iteration, (ii) integrating the error signal for obtaining the output signal, (iii) generating the feedback signal and (iv) repeating steps (i) to (iii) as required to obtain the N-th root and reciprocal with a required accuracy.

23 Claims, 2 Drawing Sheets

CALCULATING CIRCUIT AND METHOD FOR COMPUTING AN N-TH ROOT AND A RECIPROCAL OF A NUMBER

This is a continuation of parent application Ser. No. 10/177,746, filed Jun. 24, 2002.

FIELD OF THE INVENTION

The present invention relates to electronic devices that perform mathematical computations, and in particular, to an electronic circuitry for computing an N-th root and a reciprocal of a number.

BACKGROUND OF THE INVENTION

There are many computing machines and systems known in the prior art. Many of these systems can perform one or more arithmetic functions. These functions are the usual functions such as addition, subtraction, multiplication and/or division. However, an N-th root extractor, (for example, a square root extractor) and a calculator of the reciprocal of a number are usually not implemented in hardware. Instead, they are implemented in either firmware or software which has a significantly lower performance than an implementation in hardware.

A circuitry for computing the N-th root of a number may be needed in various applications. For instance, the square root of a number is used in an exponentially weighted root mean square (ERMS) detector implemented in the form of a root extracting circuit. The ERMS detector determines the energy of an electrical signal by carrying out the steps of: (i) squaring the signal, (ii) convolving the squared signal with an exponential filter, and (iii) extracting the square root of the integrated signal. These steps imply that if the input signal is s(u), then the output signal U(t) from the ERMS detector representing the energy of the input signal as function of time t is reflected by the following equation:

$$U(t) = \sqrt{\frac{1}{\tau} \int_{-\infty}^{t} s^2(u) e^{-\frac{t-u}{\tau}} du}, \quad (1)$$

where $\tau$ is a weighting constant.

Figure 1:
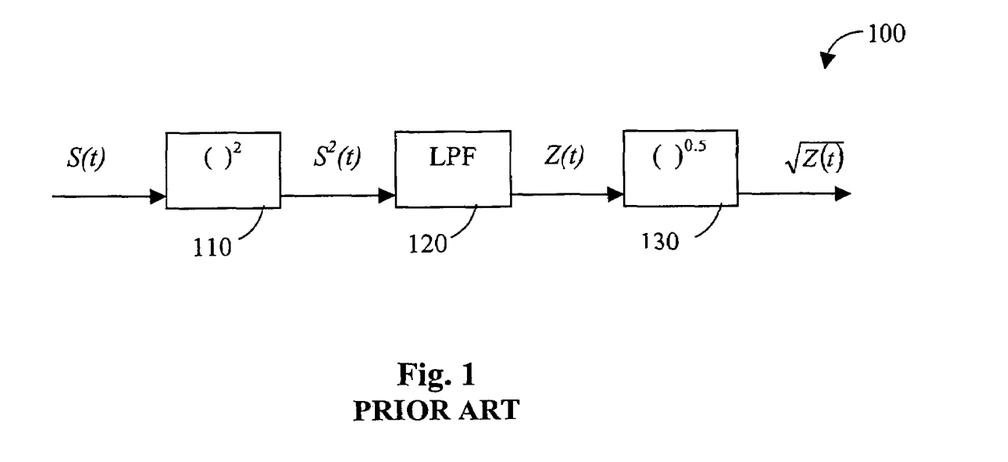
FIG. 1 is a schematic view of a conventional prior art exponentially weighted root mean square (ERMS) detector.

Referring now to FIG. 1, a typical digital ERMS detector 100 formed as a series circuit is illustrated. The ERMS detector 100 includes an input square unit 110, a low-pass filter 120 and square root extractor 130. The ERMS detector 100 receives the input signal s(u) at its input and produces the energy signal U(t) at the output. The amplitude values of the energy signal represent the energy of the original signal.

A circuitry for computing a reciprocal of a number may be used, for example, for divisional operations. In particular, the division of one number by another (i.e., A/B) can be carried out by first inverting the denominator B and then multiplying the reciprocal 1/B of the denominator by the numerator A.

Various methods and apparatuses for the purpose of determining a square root and/or a reciprocal value of a number represented by a signal (specifically a digital signal) are known in the art. These techniques include the calculations utilizing lookup tables (see, for example, U.S. Pat. Nos. 4,694,417 and 6,260,054), Newton iteration (see, for example, U.S. Pat. Nos. 5,206,823; 5,274,580 and 5,220,524), polynomial approximation (see, for example, U.S. Pat. Nos. 3,648,038; 5,235,535 and 5,798,955) and circuits that iterate recursive equations (see, for example, U.S. Pat. Nos. 4,757,467 and 6,108,682). However, the prior art square root extractors as well as the conventional computing circuits for inverting numbers are either slow or expensive, or produce output numbers that approximate the square root and reciprocal of a number with relatively low accuracy. Additionally, these techniques usually require an extensive use of memory or impose restrictions on the input values.

For example, the use of lookup tables requires that the root values are placed in a memory, e.g., a read only memory (ROM). The input signal is applied as an address code-word to the memory. Each location contains the square root value corresponding to the input number. Thus, a lookup table receives a certain signal value X and outputs the value $\sqrt{X}$ by extracting it from the memory. Although this approach is relatively fast and reliable, it requires large amounts of memory in order to store the wide range of possible square root results.

Another conventional technique for determining the N-th roots, in particular, the square roots of a number represented by an electric signal is an iterative technique referred to as the Newton method. For example, the technique utilizing the Newton method for determining the square roots may repeat execution of the following equation:

$$Y(n+1) = Y(n) - \frac{1}{2}\left(Y(n) - \frac{S}{Y(n)}\right) \quad (2)$$

wherein $Y(n+1)$ is the current estimate of the square root of the value S and $Y(n)$ is the previous estimate of the square root. This equation is iterated until the quantity $Y(n)-S/Y(n)$ converges to a sufficiently small value, i.e., until $Y(n)$ approximately equals $Y(n+1)$. The number of iterations required in order to reach a certain level of precision varies and thus, so does the duration of process. Processing Eq. (2) requires the division of the value S by successive estimates $Y(n)$, i.e., determining the reciprocal. Moreover, conventional iterative routines tend to converge slowly, making them unsuitable for systems that require rapid root extractions.

Another approach that also iterates recursive equations for calculating the square root value is disclosed in U.S. Pat. No. 4,757,467. The electronic circuit described in U.S. Pat. No. 4,757,467 performs iterations of the following equation:

$$Y(n+1) = Y(n) + \frac{1}{2}(S_{in} - Y^2(n)), \quad (3)$$

wherein $Y(n+1)$ is the current estimate of the square root of the digital sample $S_{in}$ and $Y(n)$ is the previous estimate. However, iterating this equation provides accurate results only for a limited range of the input samples. In particular, the iteration of this equation can converge to the square root values of the sample $S_{in}$, in relatively few iterations, only for sample values in the range of $0 < S_{in} \leq 2$. For larger values of $S_{in}$ equation (3) converges more slowly or diverges. This drawback can be overcome by multiplying the quantities $(S_{in} - Y(n))^2$ by the factor $2^{-(INT(\log_4(S_{in}))+1)}$, where $INT(\log_4(S_{in}))$ is the integer part of the logarithm to base 4 of the sample $S_{in}$. However, this factor includes the logarithmic function that makes the algorithm unsuitable for systems that require rapid root extractions. Moreover, nothing is indicated or suggested in U.S. Pat. No. 4,757,467 about determining the N-th root and/or reciprocal of a number represented by an electric signal.

Various other methods are known in the art for determining the mean square root and/or reciprocal values that utilize a polynomial approximation such as the Chebyshev expansion, Taylor expansion and others, which are ordinarily used for obtaining values of elementary functions. However, using such expansion techniques require a fairly long arithmetic operational time.

SUMMARY OF THE INVENTION

Despite the extensive prior art in the area of electronic devices for computing an N-th root and a reciprocal of a number, there is still a need in the art for, and it would be useful to have an electronic circuitry that determines the N-th root (where N may be any natural number equal to or larger than 2, i.e., $N \geq 2$) and/or a reciprocal of any real value in a relatively fast manner, and without employing a large amount of memory.

It would be advantageous if the electronic circuitry would perform the calculations without requiring any assumption on the input signal provided. It would be further advantageous if no such assumptions had to be made on any of the circuitry's parameters.

The present invention satisfies the aforementioned need by providing a novel calculating circuit for generating an output signal representing an output number approximating an N-th root and/or a reciprocal of an input number represented by an input signal. The calculating circuit includes a subtractor circuit responsive to a first signal and a second signal, and configured for generating an error signal representing a difference between the first and second signals.

According to one embodiment of the invention, the first signal is the input signal.

According to another embodiment of the invention, the first signal is a reference signal represented by a constant value that is equal to 1.

According to the invention, the second signal is a feedback signal, the origin and generation of which will be explained below.

The calculating circuit also includes an integrator circuit responsive to the error signal and configured for generating an output signal representing the output number. Furthermore, the calculating circuit includes a multiplier circuit responsive to the output signal and configured for generating the feedback signal. The computation is performed by using dynamic iterative calculations that are performed by using a feedback loop.

According to one embodiment of the invention, the feedback signal represents the output signal raised to the power N.

According to another embodiment of the invention, the feedback signal represents a product of the output signal and the input signal.

The integrator circuit is a component that performs an accumulation (i.e., integration) of the error signals provided by the subtractor circuit. In each iteration, the integrator circuit multiplies the error signal by a gain factor K and adds the multiplied signal to the immediately previous calculated signal. The gain factor is set to optimize between a number of iterations necessary for convergence and a number of iterations necessary to maintain stability of the feedback signal. According to one embodiment of the invention, an appropriate value of K is chosen to be a function of the input signal level.

The present invention also satisfies the aforementioned need by providing a method for generating an output signal representing an output number approximating an N-th root or a reciprocal of an input number represented by an input signal. The method includes the iterative steps: generating an error signal representing a difference between a first signal and a second signal; integrating the error signal for obtaining the output signal; generating a feedback signal. These steps are repeated the required number of times to obtain the N-th root or said reciprocal with a required accuracy.

The step of integrating the error signal includes multiplying the error signal by a gain factor K, and computing the output signal representing said output number by adding the multiplied signal to the immediately previous calculated signal.

Thus, in accordance with one broad aspect of the invention, there is provided a calculating circuit for generating an output signal representing an output number approximating an N-th root or a reciprocal of an input number represented by an input signal, the calculating circuit comprising:

a subtractor circuit responsive to a first signal and a feedback signal and configured for generating an error signal representing a difference between said first signal and said feedback signal;

an integrator circuit responsive to said error signal and configured for computing said output signal;

a multiplier circuit responsive to said output signal and configured for generating a feedback signal.

According to one embodiment of the present invention, the first signal is the input signal.

According to another embodiment of the present invention, first signal is a reference signal represented by a constant value equal to 1.

In accordance with another broad aspect of the invention, there is provided a method for a calculating circuit for generating an output signal representing an output number approximating an N-th root of an input number represented by an input signal, the calculating circuit comprising:

a subtractor circuit responsive to said input signal and configured for generating an error signal representing a difference between said input signal and a feedback signal representing the output signal raised to the power N;

an integrator circuit responsive to said error signal and configured for computing said output signal; and a multiplier circuit responsive to said output signal and configured for generating the feedback signal.

In accordance with yet another broad aspect of the invention, there is provided a calculating circuit for generating an output signal representing an output number approximating a reciprocal of an input number represented by an input signal, the calculating circuit comprising:

a subtractor circuit responsive to said input signal for generating an error signal representing a difference between a reference signal and a feedback signal representing a product of an output signal and said input signal;

an integrator circuit responsive to said error signal for generating said output signal; and a multiplier circuit responsive to said output signal and to said input signal for generating said feedback signal.

In accordance with still another broad aspect of the invention, there is provided a method for generating an output signal $Z_{out}(j)$ representing an output number approximating an N-th root or a reciprocal of an input number represented by an input signal $Z_{in}$, the method comprising the iterative steps:

(a) generating an error signal $E(j)$ representing a difference between a first signal and a feedback signal at a j-th iteration, (b) integrating said error signal E(j) for obtaining said output signal $Z_{out}(j)$;
(c) generating the feedback signal $Z_{fb}(j)$;
(d) repeating steps (i) to (iii) as required to obtain said N-th root or said reciprocal with a required accuracy.

In accordance with further broad aspect of the invention, there is provided a method for generating an output signal $Z_{out}(j)$ representing an output number approximating an N-th root of an input number represented by an input signal $Z_{in}$, the method comprising the iterative steps:
(a) generating an error signal E(j) at a j-th iteration representing a difference between said input signal $Z_{in}$ and a feedback signal $Z_{fb}(j)$ representing said output signal raised to the power N,
(b) integrating said error signal E(j) for obtaining said output signal $Z_{out}(j)$;
(c) generating said feedback signal; and
(d) repeating steps (i) to (iii) as required to obtain said N-th root with a required accuracy.

In accordance with yet further broad aspect of the invention, there is provided a method for generating an output signal $Z_{out}(j)$ representing an output number approximating a reciprocal of an input number represented by an input signal $Z_{in}$, the method comprising the iterative steps:
(a) generating an error signal E(j) representing a difference between a reference signal and a feedback signal $Z_{fb}(j)$ at a j-th iteration,
(b) integrating said error signal E(j) for obtaining said output signal $Z_{out}(j)$;
(c) generating said feedback signal representing a product of said output signal $Z_{out}(j)$ and said input signal $Z_{in}$;
(d) repeating steps (i) to (iii) as required to obtain said reciprocal of the input number with a required accuracy.

According to one embodiment of the present invention, the step of integrating said error signal E(j) includes:
(One) multiplying said error signal E(j) by a gain factor K,
(Two) computing said output signal representing said output number $Z_{out}(j)$ according to the equation $Z_{out}(j)=Z_{out}(j-1)+K \cdot E(j)$.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF SPECIFIC EMBODIMENTS

The principles and operation of the calculating circuit according to the present invention may be better understood with reference to the drawings and the accompanying description, it being understood that these drawings and examples in the description are given for illustrative purposes only and are not meant to be limiting.

Figure 2:
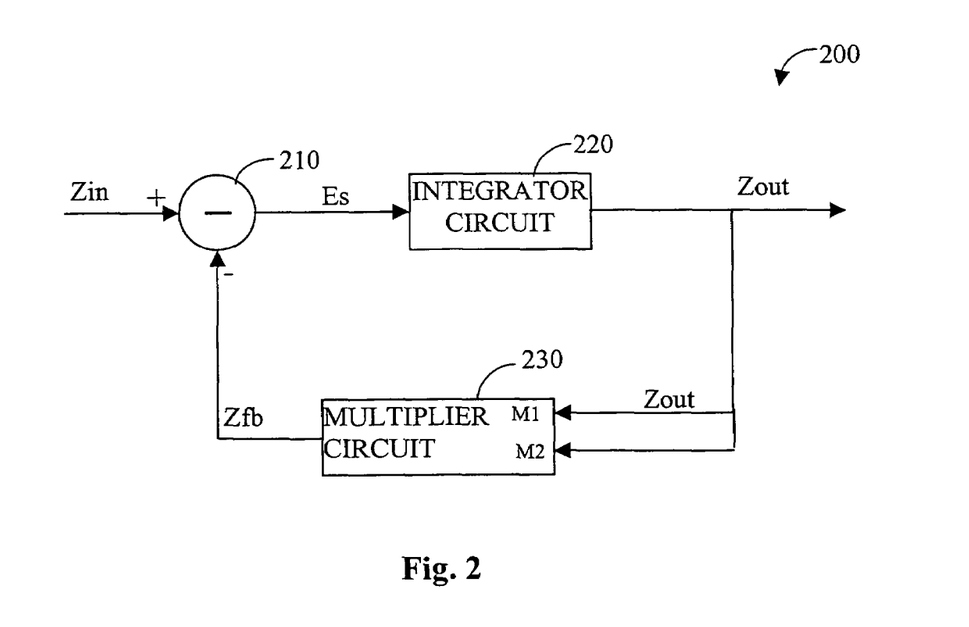
FIG. 2 is a schematic diagram illustrating a calculating circuit for generating an output signal representing an output number approximating the square root of an input number represented by an input signal, according to one embodiment of the present invention.

Referring to FIG. 2, a non-limiting exemplary schematic block diagram of an calculating circuit 200 for generating an output signal $Z_{out}$ representing an output number approximating a square root of an input number represented by an input signal $Z_{in}$ is shown. It should be noted that the blocks in FIG. 2 and in the further drawings are intended as functional entities only, such that the functional relationships between the entities are shown, rather than any physical connections and/or physical relationships.

The calculating circuit 200 includes a subtractor circuit 210 responsive to the input signal $Z_{in}$ and a feedback signal $Z_{fb}$, and configured for generating an error signal $E_s$. The error signal $E_s$ represents the difference between the input signal $Z_{in}$ and the feedback signal $Z_{fb}$. The calculating circuit 200 also includes an integrator circuit 220 responsive to the error signal $E_s$ and configured for generating the output signal $Z_{out}$. Furthermore, the electronic circuit 200 includes a multiplier circuit 230 responsive to the output signal $Z_{out}$ and configured for generating the feedback signal.

It should be appreciated that the calculating circuit 200 is a calculator that is capable of performing either digital or analog operations. According to the invention, the integrator circuit 220, the subtractor circuit 210 and the multiplier circuit 230 may be implemented as a module using an analog circuit, a digital circuit, or as part of a processor operation. For example, the subtractor circuit 210 may be implemented as a differential amplifier, a digital subtractor, or as part of a processor operation. For the purpose of this invention, a processor may be a microprocessor, microcontroller, digital signal processor (DSP) or any other electronic circuit configured for performing automatically a sequence of predefined instructions.

According to one embodiment of the invention, the integrator circuit 220 is a component that performs an integration of the error signals provided by the subtractor circuit 210. In each iteration, the integrator circuit 220 multiplies the error signal by a gain factor K and adds the multiplied signal to the immediately previous calculated signal. In other words, integrator circuit 220 implements the following recursive equation:

$$y(j)=y(j-1)+K \cdot E(j) \quad (4)$$

wherein "j" is the index of the current iteration, y(j) and y(j−1) are the current and previous estimates of the output signal, respectively, and "E(j)" is the error signal provided by the subtractor circuit 210.

The multiplier circuit 230 is a component that can multiply any one signal $M_1$ by any another signal $M_2$. According to one embodiment of the invention, the signals $M_1$ and $M_2$ are both equal to $Z_{out}$. In other words, the multiplier circuit 230 performs the operation of calculating the square power of the output signal, to wit:

$$Z_{fb}=Z_{out}^2. \quad (5)$$

As can be appreciated by a person versed in the art that the process of determining the square root of a number by using calculating circuit 200 is based on repetition of the calculation. The calculator circuit 200 utilizes a feedback mechanism where the subtractor circuit 210 receives a feedback from the output signal.

The following process is performed in each iteration. The subtractor circuit 210 receives the input signal $Z_{in}$ that remains constant during the computing process. For example, it can be a direct current (DC) signal or a sample of an alternating signal. The subtractor circuit 210 subtracts the feedback signal $Z_{fb}$ provided by the multiplier circuit 230 from $Z_{in}$. The operation ($Z_{in}-Z_{fb}$) results in the error signal $E_s$ which defines the difference between the input signal $Z_{in}$ and the calculated feedback signal $Z_{fb}$.

The integrator circuit 220 generates a new output signal, by summing the previously calculated output signal and the current error signal multiplied by the gain factor K, i.e., calculating $Z_{out}(j)=Z_{out}(j-1)+K \cdot E_s(j)$. The multiplier circuit 230 computes the square value of the signal $Z_{out}$, and generates the feedback signal $Z_{fb}$.

According to one embodiment of the present invention, at the first iteration, $Z_{fb}$ is equal to zero, therefore $E_s(0)$ is equal to $Z_{in}$ and $Z_{out}$ may be far from the desired value. Based on the characteristics of feedback systems, in each iteration the value of $E_s$ decreases and $Z_{out}$ converges to the desired value approximating the square root of the number represented by the input signal $Z_{in}$.

Alternatively, the calculating circuit 200 may be implemented as a DSP programmed to execute the iterative process described above, namely accomplishing the following steps:

(a) computing $E_s$ by subtracting $Z_{in}$ from $Z_{fb}$;
(b) computing the recursive equation $Z_{out}(j)=Z_{out}(j-1)+K \cdot E_s(j)$, where the index j represents the current iteration;
(c) computing $Z_{fb}$, which, according to this embodiment of the invention, equals to $Z_{out}(j)^2$; and
repeating steps (i) through (iii) until $E_s$ is equal to zero or below a predefined threshold level.

It should be noted that the rate of the convergence depends on the selection of the gain factor K, which must be within a range that allows for such convergence to occur. An erroneous selection of the value of K may result in the inability of the calculating circuit 200 to converge. The gain factor is determined as an optimization between a number of iterations necessary to complete the calculation and a number of iterations necessary to maintain stability of the feedback signal.

According to one embodiment of the present invention, an appropriate value of K is chosen to be a function of the input signal level. For example, the value of K can approximately be equal to $2/Z_{in}$. Moreover, any value of K below the value of $2/Z_{in}$ will ensure that convergence will occur.

According to one embodiment of the invention, the calculating circuit 200 can detect a divagation of the values of $Z_{out}$ and $E_s$ from the desired values during the calculations. For example, the divagation of $Z_{out}$ from the desired value can occur when $Z_{out}$ is larger than $Z_{in}$ or if the absolute value of $E_s(j)$ equals to $E_s(j+1)$. In such a case the calculating circuit 200 can reduce the value of K in order to ensure convergence of the method. However, the divagation of $Z_{out}$ from the desired value will not occur if $E_s$ has reached a zero value.

Reference is now made to Table 1 where a detailed example of calculation of the square root of an input number equivalent to the value of 4 is shown.

TABLE 1

| Iteration No (j) | $Z_{in}$ | $Z_{fb}$ | $E_s = Z_{in} - Z_{fb}$ | $Z_{out}(j) = Z_{out}(j-1) + K \cdot E_s(j)$ |
|---|---|---|---|---|
| 1 | 4 | 0.000 | 4.000 | 0.800 |
| 2 | 4 | 0.640 | 3.360 | 1.472 |
| 3 | 4 | 2.167 | 1.833 | 1.839 |
| 4 | 4 | 3.381 | 0.619 | 1.963 |
| 5 | 4 | 3.851 | 0.149 | 1.992 |
| 6 | 4 | 3.969 | 0.031 | 1.998 |
| 7 | 4 | 3.994 | 0.006 | 2.000 |
| 8 | 4 | 3.999 | 0.001 | 2.000 |
| 9 | 4 | 4.000 | 0.000 | 2.000 |

For this example the gain factor K is set to be 0.2. In Table 1 only the first nine iterations are shown. It can be noted that the iteration process may be stopped when the error signal $E_s$ is equal to zero (for this example, j=9), or at a predetermined level close to zero.

More specifically, at the 1-st iteration, $E_s$ is equal to 4, and $Z_{out}$ is equal to 0.8, which is far-off from the square root value of 2. It can be appreciated that as long as the calculating circuit 200 performs more iterations, the value of $E_s$ decreases and the value of $Z_{out}$ converges to the desired value. When the error value reaches zero, the $Z_{out}$ signal is equal to the correct value and the process ends. It should be noted that when the error signal reaches zero, the value of the output signal $Z_{out}$ does not change.

It should be appreciated that as an example of the application, the calculating circuit 200 can be used as a square root extractor (130 in FIG. 1) in the ERMS detector (100 in FIG. 1). According to this example, the calculating circuit 200 receives a signal Z(t) from the low-pass filter (120 in FIG. 1), and calculates the square root value of that signal. The calculation is done according to the process described above.

It should be noted that the input signal may change over each sampling time period $T_s$. Therefore, calculating circuit 200 has to converge to the desired value of $\sqrt{Z(t)}$ within the time frame of $T_s$. In order to ensure this convergence, each iteration has to be executed in a time interval that is significantly shorter than the time period $T_s$. For example, a utilization of the method described above allows making this time interval to be equal to $T_s/100$. Furthermore, as described above, the gain factor K used by the integrating circuit 220 must be adjusted, in accordance with the characteristic value of $T_s$ of the ERMS detector. Preferably, the gain factor should be equal to $\frac{1}{2}T_s y_0$, in order to reach convergence within the time interval $T_s$, where $y_o$ is approximately equal to the square-root value of $Z_{in}$.

Figure 3:
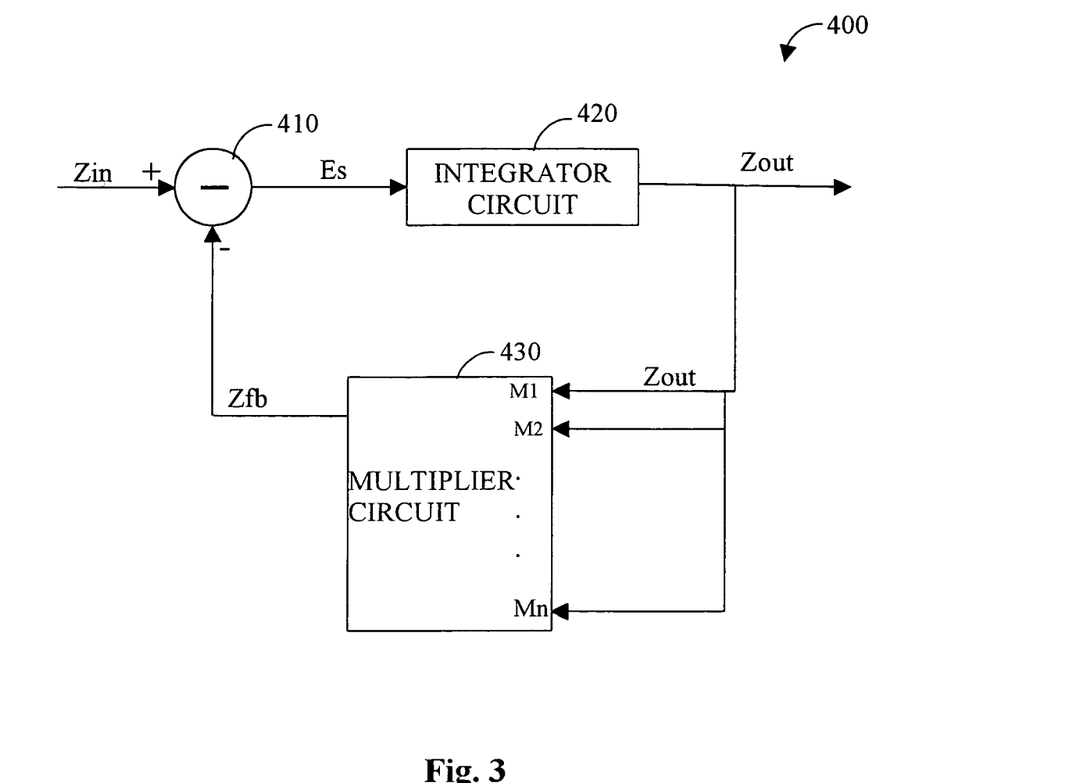
FIG. 3 is a schematic diagram illustrating a calculating circuit for generating an output signal representing an output number approximating an N-th root of an input value represented by an input signal, according to one embodiment of the present invention.

Referring to FIG. 3, a schematic diagram of a calculating circuit 400 for generating an output signal representing an output number approximating an N-th root of an input value represented by an input signal is shown, according to one embodiment of the present invention. It should be noted that the calculating circuit 400 is a generalization of the implementation of the calculating circuit (200 in FIG. 2). Hence, the calculating circuit 400 includes the same or similar main electronic components as the calculating circuit (200 in FIG. 2).

In particular, a subtractor circuit 410 is responsive to the input signal $Z_{in}$ and a feedback signal $Z_{fb}$, and configured for generating an error signal $E_s$ representing a difference between the input signal $Z_{in}$ and the feedback signal $Z_{fb}$. According to this embodiment of the invention, the subtractor circuit 410 may be implemented as a differential amplifier, a digital subtractor, or as part of a processor operation.

According to this embodiment of the invention, the integrator circuit 420 is a component that performs an integration of the error signals provided by the subtractor circuit 410. In each iteration, the integrator circuit 420 multiplies the error signal $E_s$ by a gain factor K and adds the multiplied signal to the immediately previous calculated signal. In other words, integrator circuit 420 implements the following recursive equation:

$$y(j)=y(j-1)+K \cdot E \qquad (6)$$

wherein "j" is the index of the current iteration, y(j) and y(j−1) are the current and previous estimates of the output signal, respectively, and "E(j)" is the error signal provided by the subtractor circuit 410.

The multiplier circuit 430 is a component that can multiply N signals $M_1$ through $M_N$ by each other. According to this embodiment of the invention, the signals $M_1$ through $M_N$ are all equal to $Z_{out}$. In other words, the multiplier circuit 430 performs the operation of calculating the output signal $Z_{out}$ raised to the power N, to wit:

$$Z_{fb} = Z_{out}^N. \qquad (7)$$

According to the invention, the multiplier circuit 430 may be implemented on the basis of an analog circuit, a digital circuit, or as part of a processor operation. For the purpose of this invention, a processor may be a microprocessor, micro-controller, digital signal processor (DSP) or any other electronic circuit configured for performing automatically a sequence of predefined instructions.

Reference is now made to Table 2 where a detailed example of calculation of the cubic root of an input number equivalent to the value of 27 is shown.

TABLE 2

| Iteration No (j) | $Z_{in}$ | $Z_{fb} = Z_{out}(j-1)^3$ | $E_s = Z_{in} - Z_{fb}$ | $Z_{out}(j) = Z_{out}(j-1) + KE_s$ |
|---|---|---|---|---|
| 1 | 27 | 0.000  | 27.000  | 1.350 |
| 2 | 27 | 2.460  | 24.540  | 2.577 |
| 3 | 27 | 17.113 | 9.887   | 3.071 |
| 4 | 27 | 28.972 | −1.972  | 2.973 |
| 5 | 27 | 26.270 | 0.730   | 3.009 |
| 6 | 27 | 27.249 | −0.249  | 2.997 |
| 7 | 27 | 26.912 | 0.088   | 3.001 |
| 8 | 27 | 27.031 | −0.031  | 3.000 |
| 9 | 27 | 26.989 | 0.011   | 3.000 |

For this example, the gain factor K is to be 0.05. As can be seen, the calculating circuit 400 achieves the exact result of the cubic root of 27 after nine iterations.

Table 3 shows a detailed example of calculation of the 5-th root of an input number equivalent to the value of 32.

TABLE 3

| Iteration No (j) | $Z_{in}$ | $Z_{fb} = Z_{out}(j-1)^3$ | $E_s = Z_{in} - Z_{fb}$ | $Z_{out}(j) = Z_{out}(j-1) + KE_s$ |
|---|---|---|---|---|
| 1  | 32 | 0.000  | 32.000 | 0.320 |
| 2  | 32 | 0.003  | 31.997 | 0.640 |
| 3  | 32 | 0.107  | 31.893 | 0.959 |
| 4  | 32 | 0.811  | 31.189 | 1.271 |
| 5  | 32 | 3.314  | 28.686 | 1.558 |
| 6  | 32 | 9.169  | 22.831 | 1.786 |
| 7  | 32 | 18.170 | 13.830 | 1.924 |
| 8  | 32 | 26.382 | 5.618  | 1.980 |
| 9  | 32 | 30.465 | 1.535  | 1.996 |
| 10 | 32 | 31.664 | 0.336  | 1.999 |
| 11 | 32 | 31.931 | 0.069  | 2.000 |

For this example, the gain factor K is to be 0.01. As can be seen, the calculating circuit 400 achieves the exact result of the 5-th root of 32 after eleven iterations.

It should be noted that the different values of the gain factor K are used in each case in the shown examples. The rate of the convergence depends on the selection of the gain factor K, which must be within a range that allows for such convergence to occur. The gain factor K is set to optimize between a number of iterations necessary for convergence and a number of iterations necessary to maintain stability of the feedback signal. According to the invention, the calculating circuit 400 may adaptively assign the gain factor K to the appropriate value so that $Z_{out}$ would converge to a desired value.

According to one embodiment of the invention, an appropriate value of K is chosen to be a function of the input signal level. For instance, the value of K can approximately be equal to $2/Z_{in}$. Moreover, any value of K below the value of $2/Z_{in}$ will ensure that convergence will occur.

According to another embodiment of the invention, an appropriate value of K is chosen to be a function of the value of N. For instance, the value of K can be inversely proportional to N.

Figure 4:
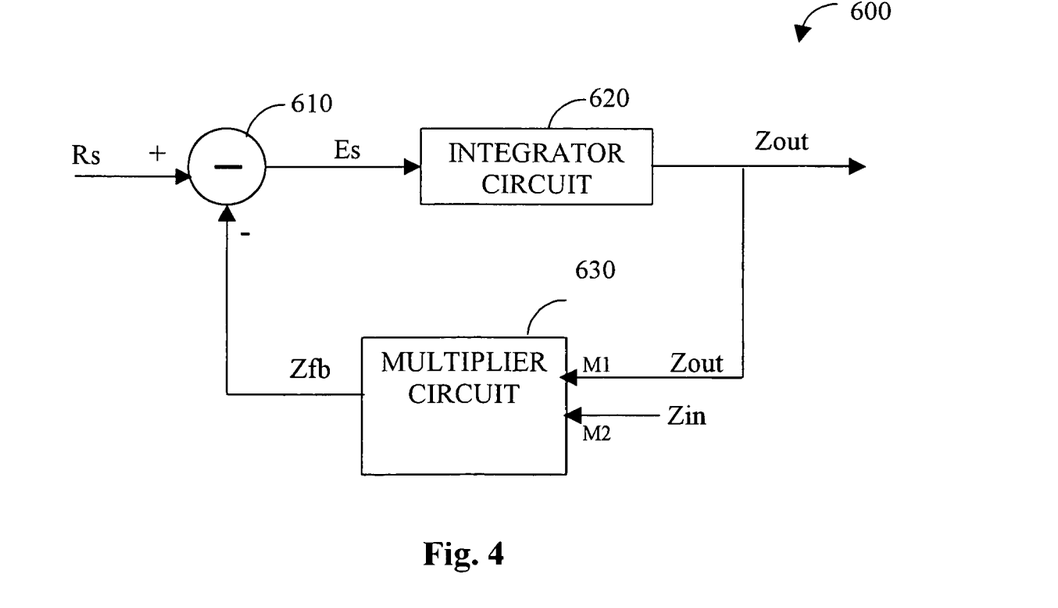
FIG. 4 is a schematic diagram illustrating a calculating circuit for generating an output signal representing an output number approximating a reciprocal of an input number represented by an input signal, according to one embodiment of the present invention.

Referring to FIG. 4, a schematic diagram illustrating a calculating circuit 600 for generating an output signal $Z_{out}$ representing an output number approximating a reciprocal of an input number represented by an input signal $Z_{in}$, according to one embodiment of the present invention.

The calculating circuit 600 includes a subtractor circuit 610 responsive to a reference signal $R_s$ and a feedback signal $Z_{fb}$, and configured for generating an error signal $E_s$. The error signal $E_s$ represents a difference between the reference signal $R_s$ and feedback signal $Z_{fb}$. The calculating circuit 600 also includes an integrator circuit 620 responsive to the error signal $E_s$ and configured to perform an integration of the error signals provided by subtractor circuit 610 in the manner described above with respect to the subtractor circuit (210 in FIG. 2) and the subtractor circuit (410 in FIG. 3). Furthermore, the calculating circuit 600 includes a multiplier circuit 630 responsive to two signals $M_1$ and $M_2$ supplied thereto and configured for generating the feedback signal representing a product of these two signals $M_1$ and $M_2$. According to this embodiment of the present invention, the signal $M_1$ is the input signal and the signal $M_2$ is the output signal.

It should be appreciated that the calculating circuit 600 is a calculator that is capable of performing either digital or analog operations. The integrator circuit 620, the subtractor circuit 610 and the multiplier circuit 630 may be implemented as a module using an analog circuit, a digital circuit, or as part of a processor operation. For example, the subtractor circuit 610 may be implemented as a differential amplifier, a digital subtractor, or as part of a processor operation. For the purpose of this invention, a processor may be a microprocessor, micro-controller, digital signal processor (DSP) or any other electronic circuit configured for performing automatically a sequence of predefined instructions.

The process for computing a reciprocal of a number is similar to that for computing an N-th root value of a number. The following process is performed in each iteration. The subtractor circuit 610 receives the reference signal $R_s$ and the feedback signal $Z_{fb}$ and generates an error signal $E_s$ that represents a difference between the reference signal $R_s$ and feedback signal $Z_{fb}$. According to this embodiment of the present invention the reference signal $R_s$ is constant and equal to one.

The integrator circuit 620 generates a new output signal, by summing the previously calculated output signal and the current error signal multiplied by the gain factor K, i.e., calculating $Z_{out}(j)=Z_{out}(j-1)+K\cdot E_s(j)$. The multiplier circuit 630 generates the feedback signal representing a product of the input signal $Z_{in}$ and the output signal $Z_{out}$.

It can be appreciated that the output signal $Z_{out}$ provided by integrator circuit 620 approximates the value of $1/Z_{in}$. Hence, the multiplication between $Z_{out}$ and $Z_{in}$ results in a signal $Z_{fb}$ which is approximately equal to one. According to this embodiment of the invention, at the first iteration, $Z_{out}$ is equal to one and $Z_{fb}$ is equal to zero. In each iteration, the value of the value of $E_s$ decreases and $Z_{out}$ converges to the desired value approximating the reciprocal of the number represented by the input signal $Z_{in}$.

The rate of the convergence depends on the selection of the factor K, which must be within a range that allows for such convergence to occur. An erroneous selection of the value of K may result in the inability of the calculating circuit 600 to converge. For example, in order to achieve the convergence of the iteration process, the gain factor can be limited to values between 0 and ½. The iteration process can operate until the error signal $E_s$ is equal to zero or below a defined threshold.

Reference is now made to Table 4 where a detailed example of calculation in each iteration of the reciprocal of an input number equivalent to the value of 2 is shown. The gain factor K in this case is set to 0.3.

TABLE 4

| Iteration No (j) | $Z_{in}$ | $Z_{fb}$ | $E_s = R_s - Z_{fb}$ | $Z_{out}(j) = Z_{out}(j-1) + KE_s$ |
|---|---|---|---|---|
| 1 | 2 | 0.000 | 1.000 | 0.300 |
| 2 | 2 | 0.600 | 0.400 | 0.420 |
| 3 | 2 | 0.840 | 0.160 | 0.468 |
| 4 | 2 | 0.936 | 0.064 | 0.487 |
| 5 | 2 | 0.974 | 0.026 | 0.495 |
| 6 | 2 | 0.990 | 0.010 | 0.498 |
| 7 | 2 | 0.996 | 0.004 | 0.499 |
| 8 | 2 | 0.998 | 0.002 | 0.500 |
| 9 | 2 | 0.999 | 0.001 | 0.500 |
| 10 | 2 | 1.000 | 0.000 | 0.500 |

In this example the first ten iterations are shown. The iteration process is stopped when the error signal $E_s$ is equal to zero. At the first iteration $E_s$ is equal to 1 and $Z_{out}$ is equal to 0.3, which is far from the inverse value of 0.5. It can be seen that as long as the calculating circuit 600 performs more iterations, the value of $E_s$ is decreased and $Z_{out}$ converges to the desired value. When the error value reaches zero, the $Z_{out}$ signal is equal to the correct value (i.e., 0.5), and the process stops. It should be noted that when the error signal reaches zero the value of the output signal $Z_{out}$ does not change.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

It is apparent that although implementations of the calculating circuit for calculating an N-th root or a reciprocal of a numerical value have been described above, it should be appreciated that such implementations may be used for calculating not only simple numerical values, but also any functions represented by an input signal $Z_{in}$ having well-defined inverse functions.

Also, it is to be understood that the phraseology and terminology employed herein are for the purpose of description and should not be regarded as limiting.

In the method claims that follow, alphabetic characters used to designate claim steps are provided for convenience only and do not imply any particular order of performing the steps.

It is important, therefore, that the scope of the invention is not construed as being limited by the illustrative embodiments set forth herein. Other variations are possible within the scope of the present invention as defined in the appended claims and their equivalents.

What is claimed is:

1. A signal processing method for generating an output signal $Z_{out}(j)$ representing an output number approximating an N-th root or a reciprocal of an input number represented by an input signal $Z_{in}$, the method comprising the iterative steps:

in an apparatus that includes a subtractor circuit, integrator circuit and multiplier circuit:

(a) generating an error signal E(f) representing a difference between a first signal and a feedback signal at a j-th iteration, (b) integrating said error signal E(j) for obtaining said output signal $Z_{out}(j)$;

(c) generating the feedback signal $Z_{fb}(j)$;

(d) repeating steps (i) to (iii) as required to obtain said N-th root or said reciprocal with a required accuracy.

2. The method of claim 1 wherein the step of integrating said error signal E(j) includes:

(One) multiplying said error signal E(j) by a gain factor K, and (Two) computing said output signal representing said output number $Z_{out}(j)$ according to the equation $Z_{out}(j)=Z_{out}(j-1)+K\cdot E(j)$.

3. The method of claim 2 wherein the value of K being a function of the input signal level.

4. The method of claim 3 wherein the value of K is equal to $2/Z_{in}$.

5. The method of claim 3 wherein the value of K is less than $2/Z_{in}$.

6. The method of claim 2 wherein said gain factor K is set to optimize between a number of iterations necessary for convergence and a number of iterations necessary to maintain stability of the feedback signal.

7. The method of claim 1 wherein said first signal is said input signal $Z_{in}$.

8. The method of claim 1 wherein said first signal is a reference signal.

9. The method of claim 1 further including generating the input signal $Z_{in}$ by squaring a received signal to generate an intermediate signal and then lowpass filtering the intermediate signal, wherein the output signal $Z_{out}(j)$ corresponds to an amount of energy in the received signal.

10. The method of claim 1 wherein said feedback signal $Z_{fb}$ is said output signal $Z_{out}(j)$ raised to the power N.

11. The method of claim 1 wherein said feedback signal $Z_{fb}(j)$ is a product of said output signal $Z_{out}(j)$ and said input signal $Z_{in}$.

12. A signal processing method for generating an output signal $Z_{out}(j)$ representing an output number approximating an N-th root of an input number represented by an input signal $Z_{in}$, the method comprising the iterative steps:

in an apparatus that includes a subtractor circuit, integrator circuit and multiplier circuit:
(a) generating an error signal E(j) at a j-th iteration representing a difference between said input signal $Z_{in}$, and a feedback signal $Z_{fb}$(j) representing said output signal raised to the power N,
(b) integrating said error signal E(j) for obtaining said output signal $Z_{out}$(j);
(c) generating said feedback signal;
(d) repeating steps (i) to (iii) as required to obtain said N-th root with a required accuracy.

13. The method of claim 12 wherein the step of integrating said error signal E(j) includes:
(One) multiplying said error signal E(j) by a gain factor K,
(Two) computing said output signal representing said output number $Z_{out}$(j) according to the equation $Z_{out}(j)=Z_{out}(j-1)+KE(j)$.

14. The method of claim 13 wherein the value of K being a function of the input signal level.

15. The method of claim 14 wherein the value of K is equal to $2/Z_{in}$.

16. The method of claim 14 wherein the value of K is less than $2/Z_{in}$.

17. The method of claim 13 wherein said gain factor K is set to optimize between a number of iterations necessary for convergence and a number of iterations necessary to maintain stability of the feedback signal.

18. The method of claim 12, further including generating the input signal $Z_{in}$ by squaring a received signal to generate an intermediate signal and then lowpass filtering the intermediate signal, wherein the output signal $Z_{out}$(j) corresponds to an amount of energy in the received signal.

19. A signal processing method for generating an output signal $Z_{out}$(j) representing an output number approximating a reciprocal of an input number represented by an input signal $Z_{in}$, the method comprising the iterative steps:

in an apparatus that includes a subtractor circuit, integrator circuit and multiplier circuit:
(a) generating an error signal E(j) representing a difference between a reference signal and a feedback signal $Z_{fb}$(j) at a j-th iteration,
(b) integrating said error signal E(j) for obtaining said output signal $Z_{out}$(j); (c) generating said feedback signal representing a product of said output signal $Z_{out}$(j) and said input signal $Z_{in}$;
(c) repeating steps (i) to (iii) as required to obtain said reciprocal of the input number with a required accuracy.

20. The method of claim 19 wherein the step of integrating said error signal E(j) includes:
(One) multiplying said error signal E(j) by a gain factor K,
(Two) computing said output signal representing said output number $Z_{out}$(j) according to the equation $Z_{out}(j)=Z_{out}(j-1)+K\cdot E(j)$.

21. The method of claim 20 wherein said gain factor K is limited to the values between 0 and ½.

22. The method of claim 20 wherein said gain factor K is set to optimize between a number of iterations necessary for convergence and a number of iterations necessary to maintain stability of the feedback signal.

23. The method of claim 19 wherein said reference signal is represented by a constant value equal to 1.

\* \* \* \* \*

UNITED STATES PATENT AND TRADEMARK OFFICE
CERTIFICATE OF CORRECTION

PATENT NO. : 7,668,898 B2  Page 1 of 1
APPLICATION NO. : 11/316891
DATED : February 23, 2010
INVENTOR(S) : Manor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1092 days.

Signed and Sealed this

Seventh Day of December, 2010

David J. Kappos
*Director of the United States Patent and Trademark Office*